US008647100B2

(12) United States Patent
Grunitz

(10) Patent No.: US 8,647,100 B2
(45) Date of Patent: Feb. 11, 2014

(54) INJECTION MOULDING MACHINE AND HYDRAULIC UNIT FOR THIS

(75) Inventor: Otto Grunitz, Nürnberg (DE)

(73) Assignee: Sumitomo (Shi) Demag Plastics Machinery GmbH, Schwaig (DE)

( * ) Notice: Subject to any disclaimer, the term of this patent is extended or adjusted under 35 U.S.C. 154(b) by 345 days.

(21) Appl. No.: 13/015,182

(22) Filed: Jan. 27, 2011

(65) Prior Publication Data

US 2011/0189333 A1   Aug. 4, 2011

(30) Foreign Application Priority Data

Feb. 4, 2010  (DE) .......................... 10 2010 001 595

(51) Int. Cl.
*B29C 45/40* (2006.01)
*B29C 45/67* (2006.01)

(52) U.S. Cl.
USPC ............ 425/150; 425/556; 425/575; 425/595

(58) Field of Classification Search
USPC .................................. 425/556, 595, 150, 575
See application file for complete search history.

(56) References Cited

U.S. PATENT DOCUMENTS

| | | | | |
|---|---|---|---|---|
| 4,720,087 A * | 1/1988 | Duclos et al. | ............ | 267/140.14 |
| 4,790,522 A * | 12/1988 | Drutchas | ........................ | 267/225 |
| 5,029,823 A * | 7/1991 | Hodgson et al. | ......... | 267/140.14 |
| 5,390,121 A * | 2/1995 | Wolfe | ............................. | 701/37 |
| 5,524,743 A * | 6/1996 | Bullough et al. | ............. | 192/21.5 |
| 5,732,740 A * | 3/1998 | Hornyack et al. | ............... | 138/26 |
| 6,158,470 A * | 12/2000 | Ivers et al. | ..................... | 137/807 |
| 6,271,828 B1 * | 8/2001 | Rosenberg et al. | ........... | 345/156 |
| 6,378,558 B1 * | 4/2002 | Pohl et al. | ...................... | 137/827 |
| 6,379,119 B1 * | 4/2002 | Truninger | ........................ | 417/22 |
| 6,527,540 B1 * | 3/2003 | Dantlgraber | .................. | 425/589 |
| 6,740,125 B2 * | 5/2004 | Mosler | ............................ | 623/45 |
| 6,939,504 B2 * | 9/2005 | Homann et al. | .............. | 264/572 |
| 7,191,738 B2 * | 3/2007 | Shkolnik | ......................... | 123/19 |
| 7,942,248 B2 * | 5/2011 | St. Clair et al. | ............ | 188/267.1 |
| 2003/0042640 A1 * | 3/2003 | Kubota | ........................ | 264/40.1 |
| 2007/0054007 A1 * | 3/2007 | Yamaura et al. | .............. | 425/587 |
| 2010/0219360 A1 * | 9/2010 | Mumford et al. | ............... | 251/12 |
| 2012/0146260 A1 * | 6/2012 | Murata et al. | .............. | 264/328.1 |
| 2012/0248654 A1 * | 10/2012 | Van Eerde et al. | ....... | 264/328.19 |

OTHER PUBLICATIONS

Martin Gurka: "ER-Technologie schaltbare Fluide in industriellen und mobilen Anwendungen", in: DGM Themenfindungsworkshop, Oct. 15, 2009.
M. Zaun: "Design Concept for the Development of Cylinder Drives based on electrorheological Fluids", in: World Scientific, Aug. 16, 2004.

* cited by examiner

*Primary Examiner* — Yogendra Gupta
*Assistant Examiner* — Emmanuel S Luk
(74) *Attorney, Agent, or Firm* — Henry M Feiereisen LLC

(57) ABSTRACT

An injection molding machine includes an injection unit with drive units form the movement of the injection unit and for the injection and after-pressure stroke of the plasticizing screw, a tool clamping plate, a mould closing unit with a drive unit form the mould movement and tool closing force and a drive unit for a workpiece ejector device, wherein at least one drive unit is a hydraulic drive unit with a hydraulic pump, a hydraulic cylinder and control valves to activate the hydraulic cylinder, and wherein the hydraulic fluid is an electrorheological fluid and the control valve for the hydraulic cylinder is an electrorheological valve.

15 Claims, 8 Drawing Sheets

INJECTION MOULDING MACHINE AND HYDRAULIC UNIT FOR THIS

FIELD OF THE INVENTION

The invention relates to an injection moulding machine comprising an injection unit with a plasticising screw and drive units for the movement of the injection unit and for the injection and after-pressure stroke of the plasticising screw, a fixed and a moveable tool clamping plate, a mould closing unit with a drive unit for generating the mould closing and opening movement of the moveable tool clamping plate and the tool closing force during injection, and a drive unit for a workpiece ejector device, wherein at least one of the drive units is a hydraulic drive unit with a hydraulic pump, a hydraulic cylinder and one or more control valves to activate the hydraulic cylinder. The invention further relates to a hydraulic drive unit for a corresponding machine tool, in particular an injection moulding machine, with a hydraulic pump, a hydraulic cylinder and one or more control valves to activate the hydraulic cylinder.

BACKGROUND OF THE INVENTION

A generic injection moulding machine has the usual components of a machine of this type, namely an injection unit with a plasticising screw and drive units to generate the movement of the injection unit itself and the injection and after-pressure stroke of the plasticising screw. Furthermore, a fixed and a moveable tool clamping plate are conventionally provided, on which the respective half moulds are attached. In a so-called three-plate machine, a further support plate for the mould closing unit displacing the moveable tool clamping plate can optionally be provided. The mould closing unit has a drive unit to generate the mould closing and opening movement of the moveable tool clamping plate and to apply the so-called tool closing force during injection. Finally, a workpiece ejector device with a corresponding drive unit is provided on a tool clamping plate.

Injection moulding machines were originally designed as hydraulic machines with respect to their drive units but for some time, certain drive axles have been controlled by electromechanical drive assemblies such as servomotors. So-called fully electric machines are also already conventional.

The present invention relates to injection moulding machines, in which at least one of the drive units is hydraulic and, accordingly, a hydraulic pump, a hydraulic cylinder and one or more control valves are provided to activate the hydraulic cylinder.

In the known hydraulic drive units, the movement speeds of this axle to be driven in each case of the injection moulding machine are controlled by proportional servo valves of control pumps. Conventional zero-one valves in this case realise switch-on or switch-off delays of 30 to 60 ms. The dynamics of control pumps are in similar time ranges. Servo valves with shorter reaction times are known but these are very expensive and, with reaction times in the range of 15 to 20 ms, also not yet optimal for the requirements of an injection moulding machine.

Machines of this type are distinguished by the fact that the precision and reaction speed of the machine are determined by the dynamics of the activation of the individual axes. For example, time delays of the hydraulic actuators during the switch over in the plasticising screw from injection pressure to after-pressure are disadvantageous. The dynamics of the screw movement have to be greatly reduced in the vicinity of this switch-over point in order to avoid pressure overshoots in the tool. The latter would cause so-called over-injections or "webs" in the region of the mould division plane, damage the injection moulding material itself and cause stresses therein, which can later lead to distortion of the product produced. Coinciding problems also occur in electromagnetic injection moulding machines, as the electric rotary drives used therein have inevitable mass moments of inertia and can also therefore not be switched between two operating states adequately rapidly and dynamically.

SUMMARY OF THE INVENTION

Proceeding from the problems outlined of the prior art, the invention is based on the object of improving an injection moulding machine with at least one hydraulic drive unit in such a way that the drive dynamics, in particular with regard to the switching times of the valves used therein, can be drastically improved.

This object is achieved by the invention in that
the hydraulic fluid of the hydraulic drive unit is an electrorheological fluid, and
the at least one control valve for the hydraulic cylinder is an electrorheological (=ER) valve with
at least one through-flow gap for the electrorheological fluid and
a capacitor arrangement for applying an electric control field across the through-flow gap.

The particular advantage of hydraulic drive units based on ER valves is the extraordinarily high dynamics of the valves, which are in the order of magnitude of 2 to 4 ms for the operating range of 0 to 100%. Based on this control valve behaviour, very exact positionings can be carried out using the hydraulic cylinders actuated in this manner, which can, in addition, be started substantially more dynamically. Overall, the greatly reduced reaction times linked with low masses of the components involved produce overall dynamics of the drive system, which are neither achieved by conventional hydraulic injection machines nor by electric ones. Injection pressure/after-pressure curve transitions, which may be at least five times faster compared to servo-controlled injection moulding machines, are possible, especially on the injection side, owing to the properties brought about by the invention. Moreover, the positioning precision in the mould closing unit, even in fast running applications, is identical to comparable electrochemical solutions at considerably lower costs. It is advantageous here that such fast running applications can be structurally derived from standard machines because of the technology based on ER valves. Finally, the entire system has a high energy density, which is comparable with the hydraulic injection moulding machines.

According to a preferred embodiment, a hydraulic fluid store for electrorheological fluid under pressure is associated with at least one hydraulic pump. The provision of the electrorheological fluid connected therewith leads to the fact that no high load peaks occur because of the pump store combination on the feed side. The pump can substantially run at base load and can be adjusted to constant performance by readjusting the pivot angle of the respective load situation of the hydraulic fluid store. The motor can therefore be constantly operated under nominal load, so optimal energy supply conditions from energy suppliers are produced for the user of the machine.

According to further preferred embodiments, the invention provides the situation-adapted distribution of the hydraulic pump(s) optionally with hydraulic store(s) for all the drive units of the injection and mould closing unit as the central assembly or the distribution of hydraulic pumps with a hydraulic store individually or in subgroups over various drive units.

The hydraulic cylinders are preferably configured as two-way cylinders, in other words, make a so-called "clamped operation" of the cylinder possible. Activation may, in each case take place by means of an H-valve full bridge consisting of four ER valves. This arrangement is conceptionally comparable with an electric servo drive, in which the electric motor lies in the diagonal of the IGBT bridge between the positive and negative operating voltage. To this extent, fundamental control aspects can be transferred from the known machines with an electric servo drive to the machine according to the invention. This facilitates the control configuration of these new types of machines considerably.

According to further preferred embodiment, the ER valves can be integrated directly into the hydraulic cylinders. This allows particularly compact drive units to be realised.

Further preferred embodiments of the invention relate to the configuration of the ER valves as annular gap valves. Conventional gap widths are in the range between 0.2 and 1.0 mm and are therefore substantially easier to manage in terms of tolerances than the production of a servo valve, in which the corresponding tolerance requirements are generally in the micrometer range. With a skilled arrangement of the annular gaps of the ER valves, for example preferably by assembling the ER valves as a valve group from a large number of individual valve units preferably connected in parallel, opening ratios of >0.5 can be realised. The dimensions of the ER valve actuators are therefore within the range of comparable, but substantially more sluggish hydraulic valves. The large opening ratio in this context is important for a low flow resistance in the non-switched, open state of the valve.

Further preferred embodiments relate to the combination of at least two ER valves to form a valve block, which is then responsible for the activation of the respective number of axles of the machine. This allows structurally advantageous component assemblies to be realised to active the machine axles.

Further features, details and advantages of the invention emerge from the following description in which embodiments are described in more detail with the aid of the accompanying drawings.

DESCRIPTION OF THE PREFERRED EMBODIMENTS

Figure 1:
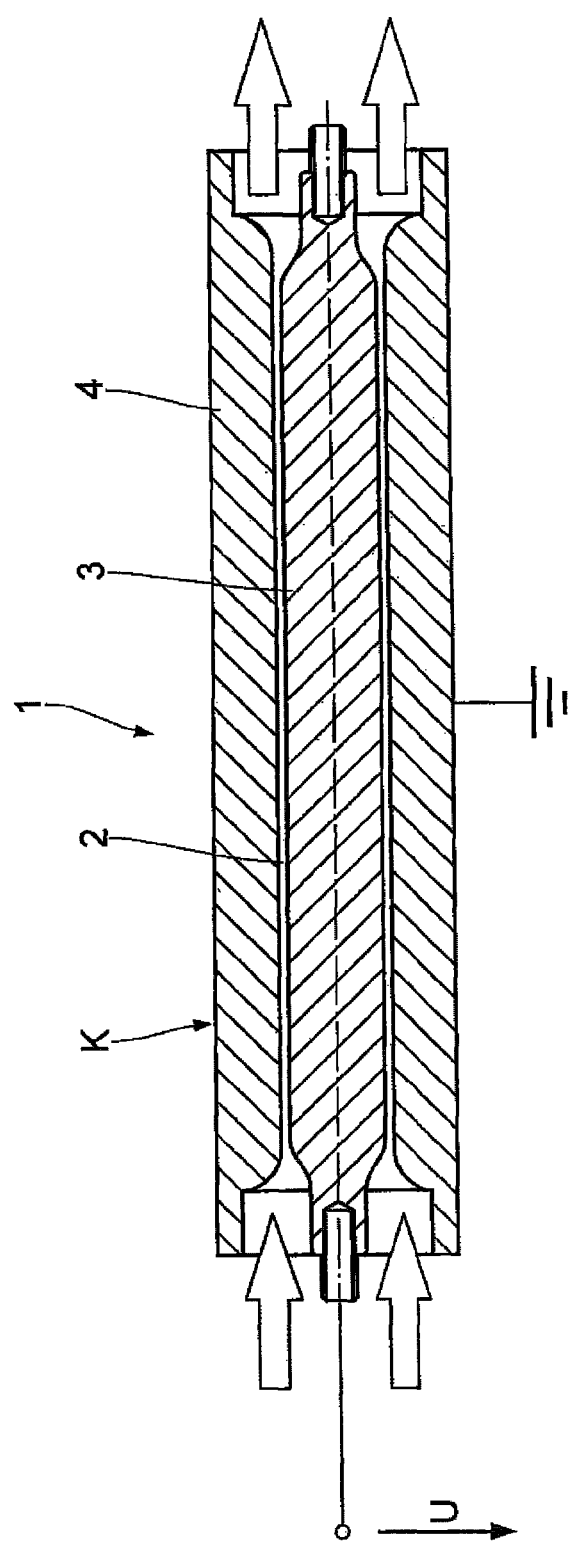
FIG. 1 shows a schematic longitudinal section through an electrorheological individual valve unit.

The mode of functioning of an electrorheologically operating valve unit 1 is firstly to be illustrated with the aid of FIG. 1. The starting point is the use of an electrorheological fluid as a hydraulic medium. ER fluids of this type change their rheology, in other words their flow properties, as a function of an applied electric field. In order to realise a switchable valve function, a valve gap—an annular gap 2 in the embodiment according to FIG. 1—is applied in a type of plate capacitor arrangement K between a central bar electrode 3 and the cylindrical housing 4 surrounding it. The ER fluid flows through this annular gap when the valve is not switched, with a characteristic corresponding to conventional hydraulic fluids, if the ER fluid has the same or a lower dynamic viscosity.

When applying a potential U to the bar electrode 3, an electric field is formed across the annular gap 2 to the earthed housing 4 owing to this capacitor arrangement K, by means of which electric field the viscosity of the ER fluid is increased. With an adequately high viscosity, the fluid guidance through the annular gap 2 becomes impossible, the flow of the hydraulic fluid is therefore interrupted and the valve is thus switched to "block".

In order to avoid lengthy statements regarding the design of the ER valve unit 1, reference is made to a specialist article by M. Zaun "Antriebe mit kurzen Reaktionszeiten", O+P 5/2005, pages 2 to 6, where cylinder drives based on electrorheological fluids are described in detail. It should merely be noted that the gap widths of the annular gap 2 may lie approximately in the range between 0.2 and 1 mm. Field intensities of the electric field between the electrode 3 and housing 4 are currently in the order of magnitude of 3000 to 5000 V/mm. The product "RheOil" from Fludicon GmbH, Darmstadt, can be used as the hydraulic fluid, for example.

Figure 2:
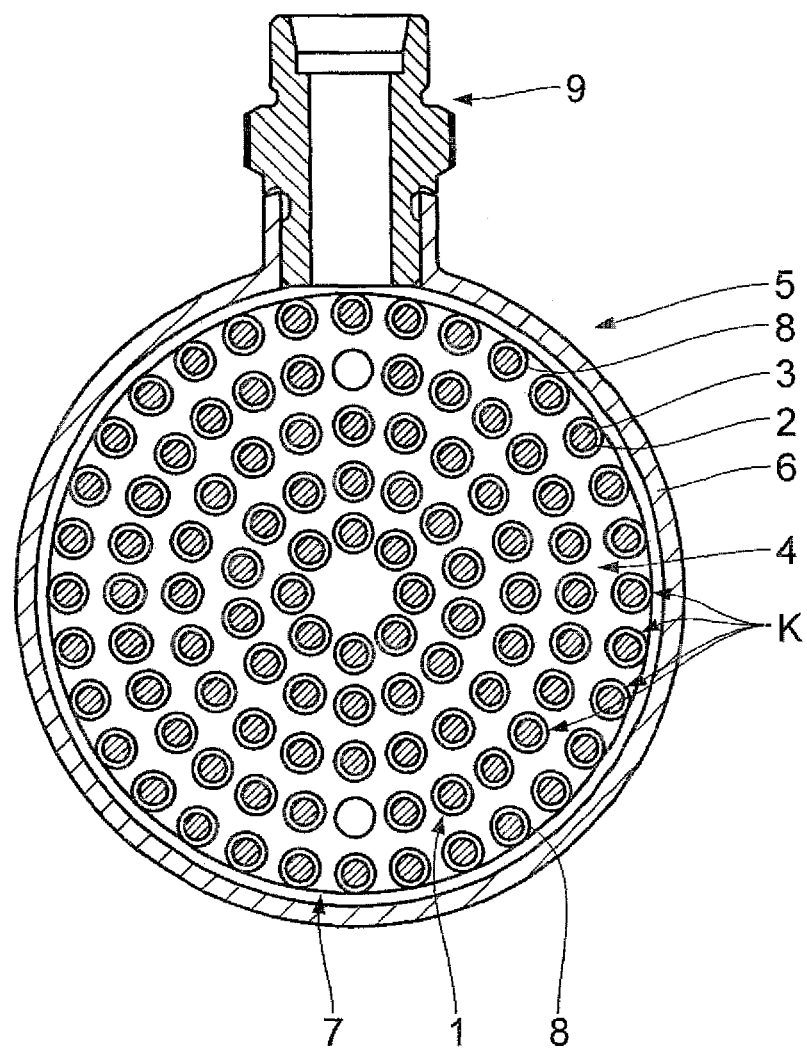
FIG. 2 shows a cross section of an electrorheological valve.

FIG. 2 shows the grouping of a large number of valve units 1 to form an ER valve 5. An insert body 7 with a large number of axially parallel longitudinal bores 8 is inserted in a cylindrical outer housing 6. The insert body 7 forms the outer electrode or earth of the individual valve units 1. A bar electrode 3 configured as a high-voltage electrode is in each case inserted in the longitudinal bore 8, with the annular gap 2 remaining between said bar electrode and the inner wall of the longitudinal bore 8. At the ends of the insert body 7, a respective flow space remains, which is connected to the inflow 9 or the outflow, not visible in FIG. 2, which is aligned with the inflow in the viewing direction. The configuration of the ER valve 5 shown has an opening ratio of 0.5. The entire valve arrangement is characterised by a small flow resistance and a simple structure.

Figure 3:
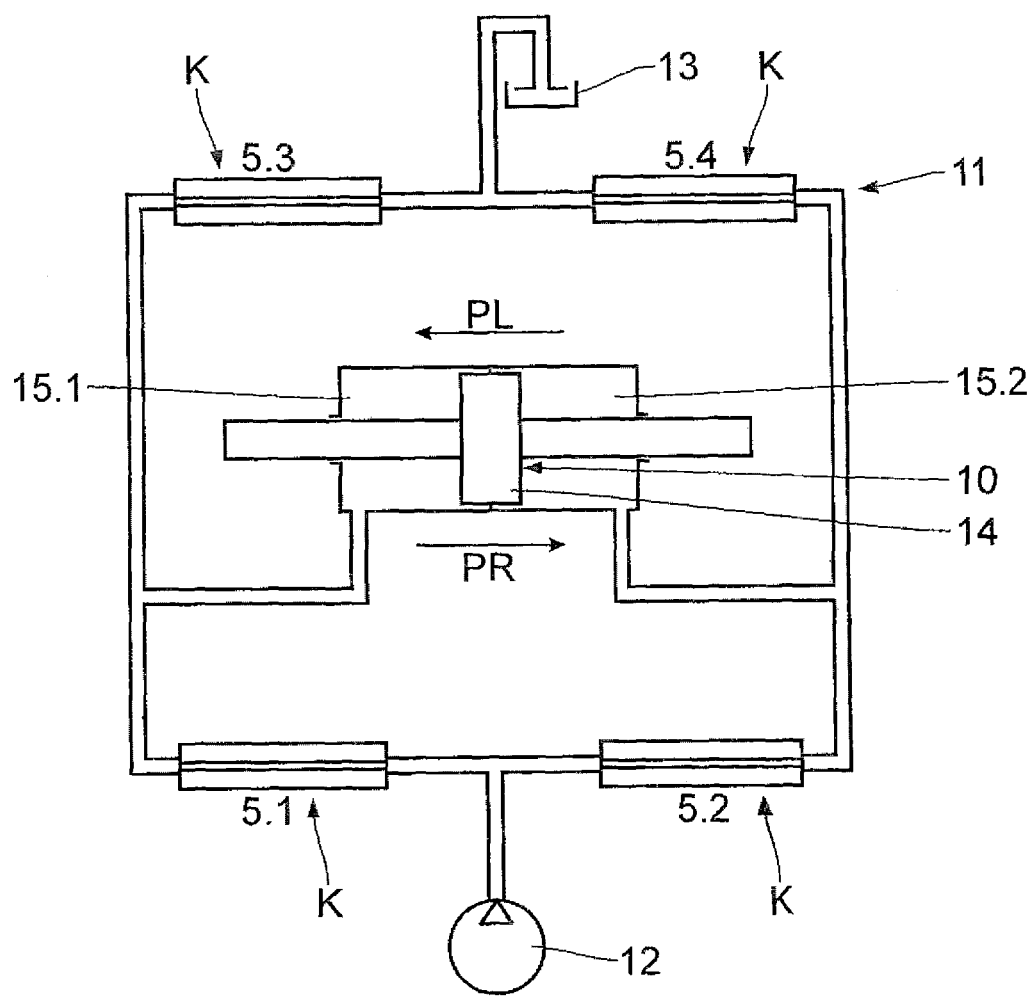
FIG. 3 shows a hydraulic plan of the activation of a two-way hydraulic cylinder.

FIG. 3 shows the activation of a hydraulic cylinder configured as a two-way cylinder 10 with the aid of an H-full bridge 11. Proceeding from a hydraulic pump 12, which draws hydraulic fluid from a tank 13, the two working chambers 15.1, 15.2 of the hydraulic cylinder 10 located either side of the piston 14 are supplied with hydraulic fluid by means of valves 5.1, 5.2 in each case connected as in parallel. The two operating chambers are also in turn connected to the tank 13 by a respective ER valve 5.3, 5.4.

To actuate the cylinder in the arrow direction PL in FIG. 3, the valve 5.2 remains open, in other words is not activated, whereas the capacitor arrangement K supplies the valve 5.1 with voltage and therefore blocks it. Alternately, the valve 5.3 is open and the valve 5.4 closed. With this constellation, the piston 14 is moved in the arrow direction PL.

Within a few milliseconds, the valves 5.1 to 5.4 can be activated precisely in an opposing manner for a highly dynamic reversal, so the valves 5.1 and 5.4 are opened and the valves 5.2 and 5.3 closed. The piston 14 then travels in the opposing direction PR.

The electrorheological fluid used in the hydraulic circuit as the hydraulic medium should not be abrasive. In order to realise low electric losses over the electric field between the electrode 3 and the housing 4, the hydraulic fluid is also insulating.

Figure 4:
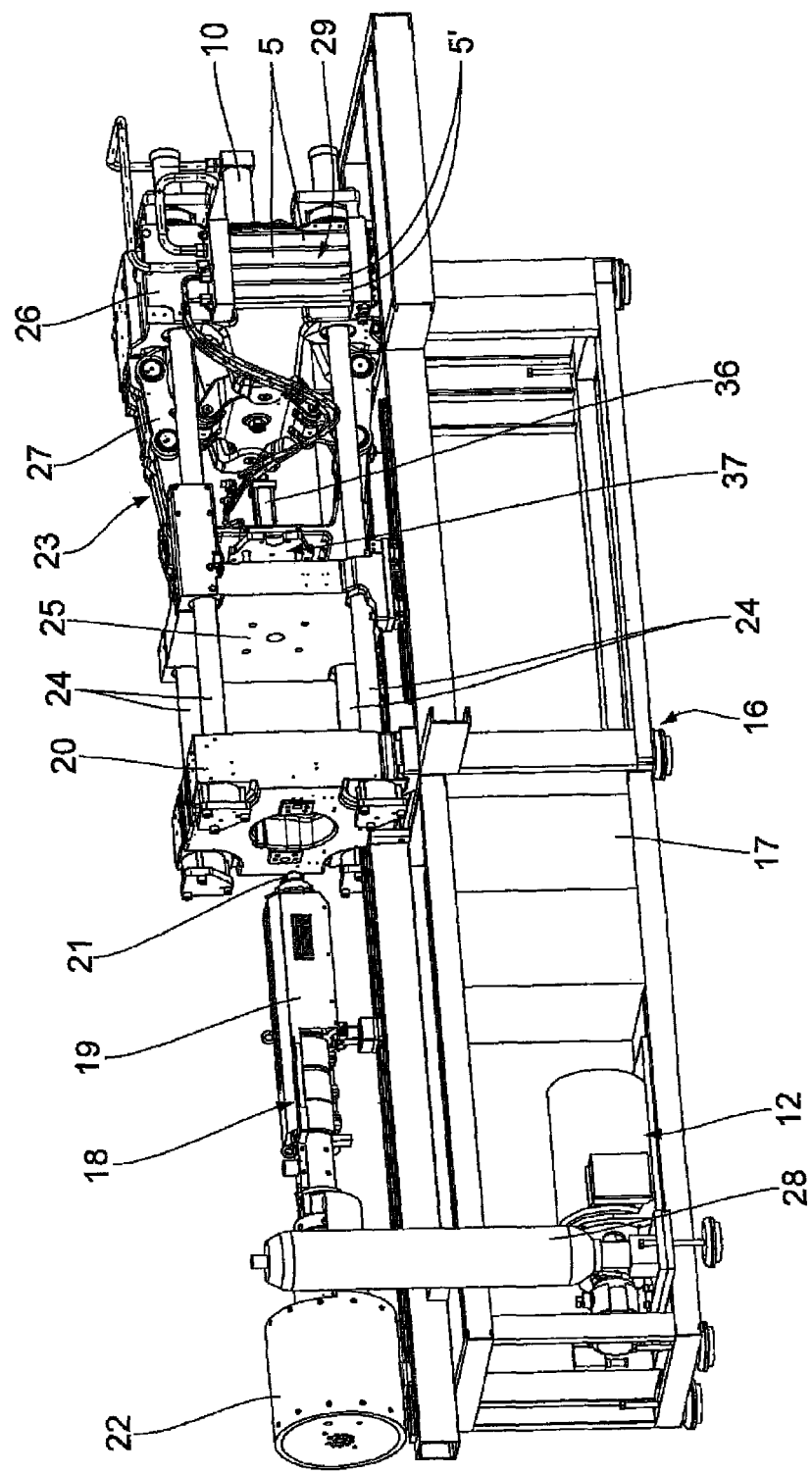
FIGS. 4 and 5 show perspective views of an injection moulding machine in two different embodiments.
Figure 5:
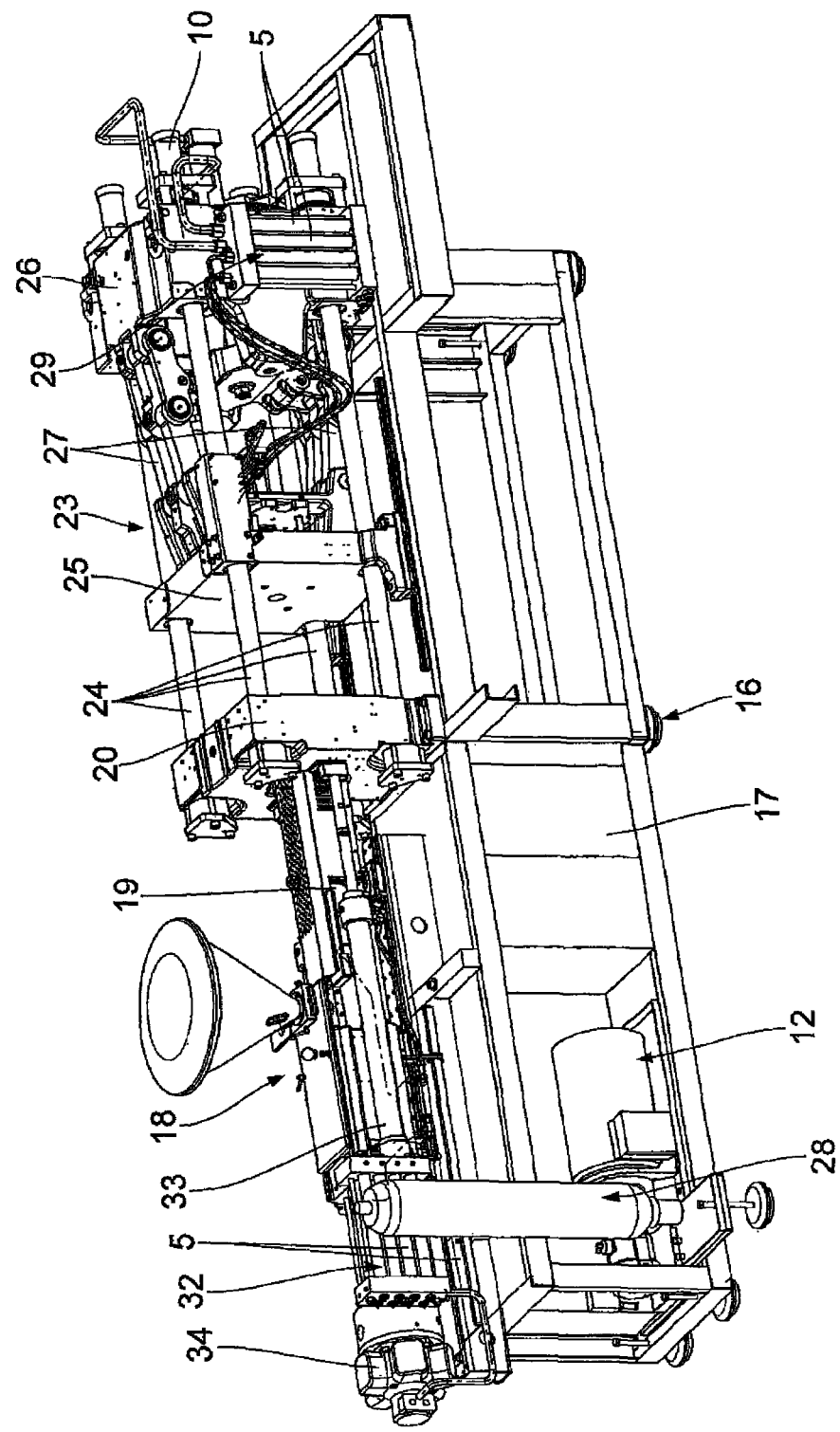
Figure 6:
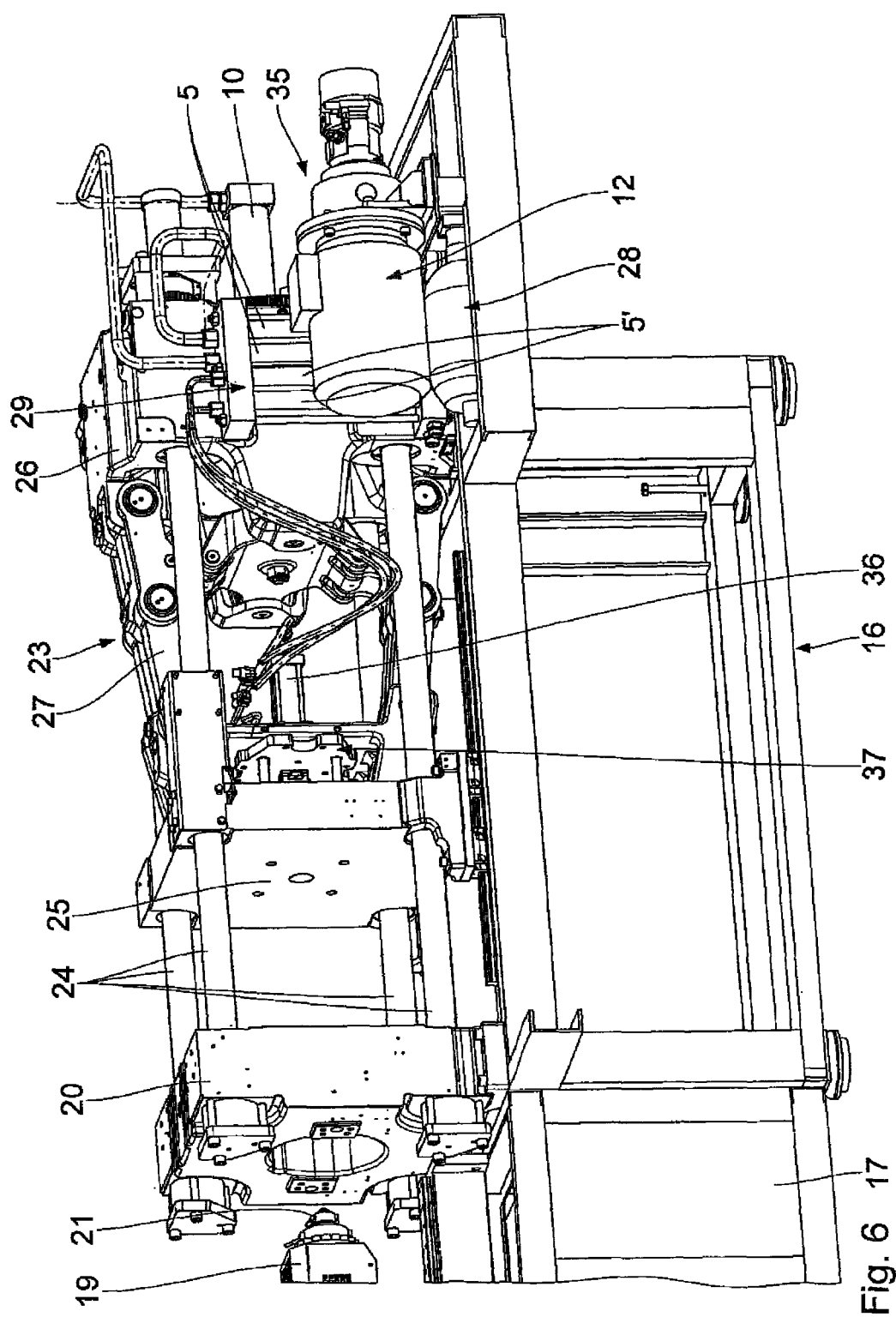
FIG. 6 shows a perspective partial view of an injection moulding machine in a further embodiment.

Various embodiments of injection moulding machines that are provided with ER valves and operated with electrorheological fluids as the hydraulic fluid are now illustrated in FIGS. 4 to 6. Thus, FIG. 4 shows an injection moulding machine with a conventional machine frame 16, in which a switching cabinet 17 with a corresponding controller for the machine components is accommodated. On the one hand, the injection unit 18 with a plasticising cylinder 19 and the injection nozzle 21 which can be docked to the fixed tool clamping plate 20 by a displacement movement of the injection unit 18, is arranged on the machine frame 16. An electromechanical or hydraulic drive 22 for the rotary movement of the screw, not shown in more detail, in the plasticising cylinder 19 is shown at the outer end of the injection unit 18.

The mould closing unit designated 23 as a whole, which has a tool clamping plate 25, which can be moved on horizontal pillars 24 relative to the fixed tool clamping plate 20, is also arranged on the machine frame 16. Fastened between the tool clamping plates 20, 25 is the injection mould, not shown in more detail in the drawings, with the two mould halves. The pillars are mounted in a support plate 26 on the rear of the moveable tool clamping plate 25 remote from the fixed tool clamping plate 20. Provided between the support plate 26 and the moveable tool clamping plate 25 is a hydraulically driven knee lever mechanism 27, with the aid of which the opening and closing of the moveable tool clamping plate 25 and the keeping shut of the mould during the injection moulding process are brought about.

The knee lever mechanism 27 can be actuated by means of a hydraulic cylinder 10, which can be activated by means of ER valves 5, as illustrated in more detail with the aid of FIG. 3. The electrorheological hydraulic fluid itself is provided by means of a hydraulic pump 12 mounted below the injection unit 21 in the machine frame 16, a hydraulic store 28 being associated with said hydraulic pump.

Figure 8:
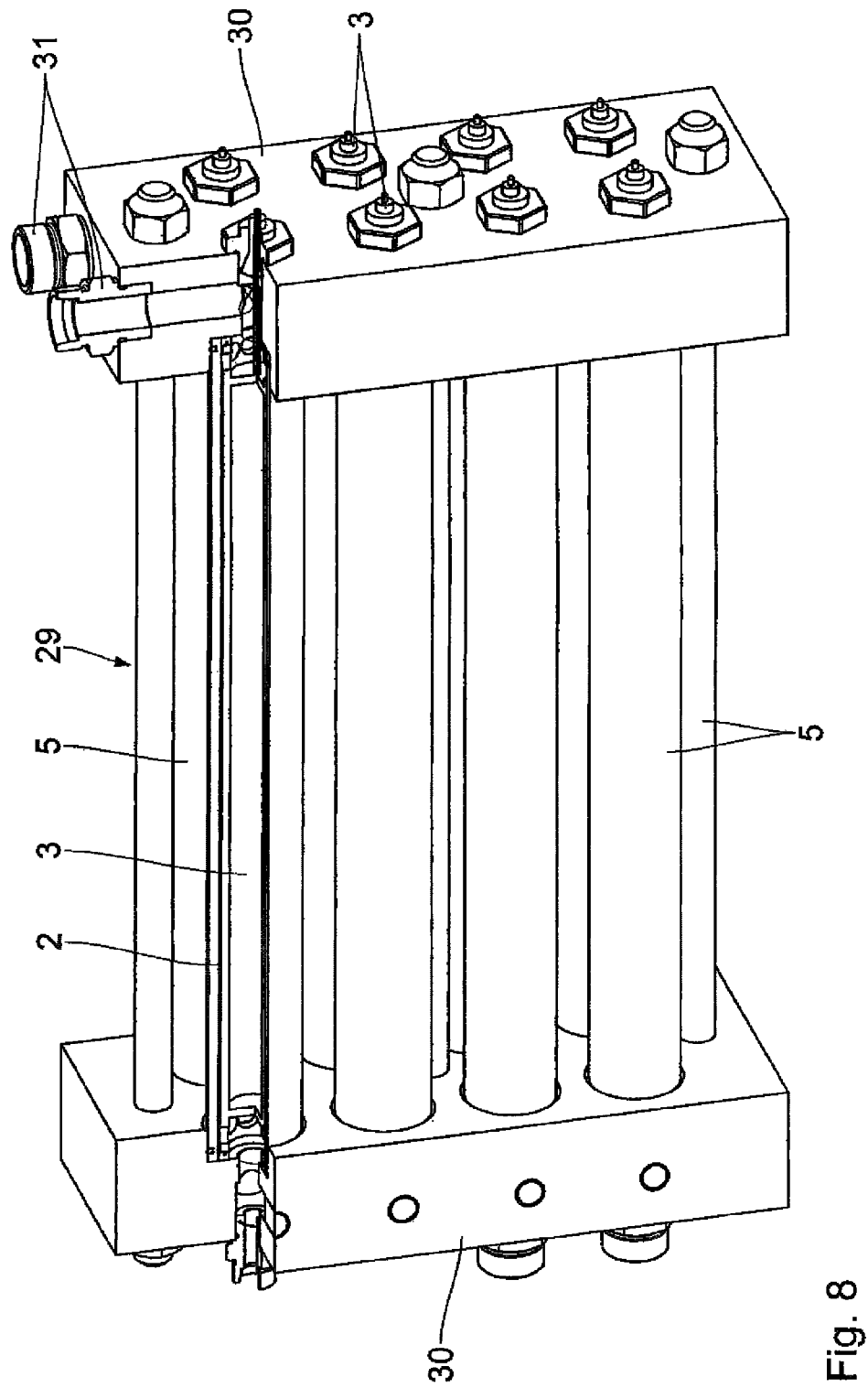

As also indicated in FIG. 4, further ER valves 5' with smaller hydraulic cylinders 36 are coupled to the moveable tool clamping plate 20, so hydraulically activated ejectors 37 for the workpieces can also be actuated. As becomes clear from FIG. 8, the ER valves 5, 5' shown in FIG. 4 can be combined to form a valve block 29, which is thus designed to actuate the hydraulic cylinders of two axles of the injection moulding machine—in other words, for example, the mould closing and ejector stroke as in FIG. 4. For this purpose, respective ER valves 5 are combined on the head side in assembly holders 30, which take on the mechanical fastening of the individual components of the ER valves 5, ensure the insulated voltage supply at the electrodes 3 and receive the fluid lines 31.

In the embodiment of an injection moulding machine shown in FIG. 5, apart from the valve block 29 in the region of the mould closing unit 23, a further such valve block 32 is provided in the region of the injection unit 18, by means of which the hydraulic cylinder 33 can be activated for the movement of the injection unit 18 and the hydraulic drive 34 can be activated for the injection and withdrawal movement of the plasticising screw. The hydraulic pump 12 with the hydraulic store 28 in this case supplies the two valve blocks 29 and 32 with the electrorheological hydraulic fluid by means of hydraulic fluid lines, not shown in more detail.

A separate hydraulic component assembly 35 for the mould closing unit 23 and the ejectors 37 is provided detached from the injection unit in the embodiment shown in FIG. 6. Accordingly, this hydraulic component assembly 35 is assembled on the machine frame 16 next to the ER valve block 29 and has its own hydraulic store 28 and its own hydraulic pump 12.

Moreover, the injection moulding machines shown in FIGS. 5 and 6 correspond to the embodiment according to FIG. 4. Coinciding components are provided with identical reference numerals and reference can be made to the corresponding description of FIG. 4 to avoid repetitions.

Figure 7:
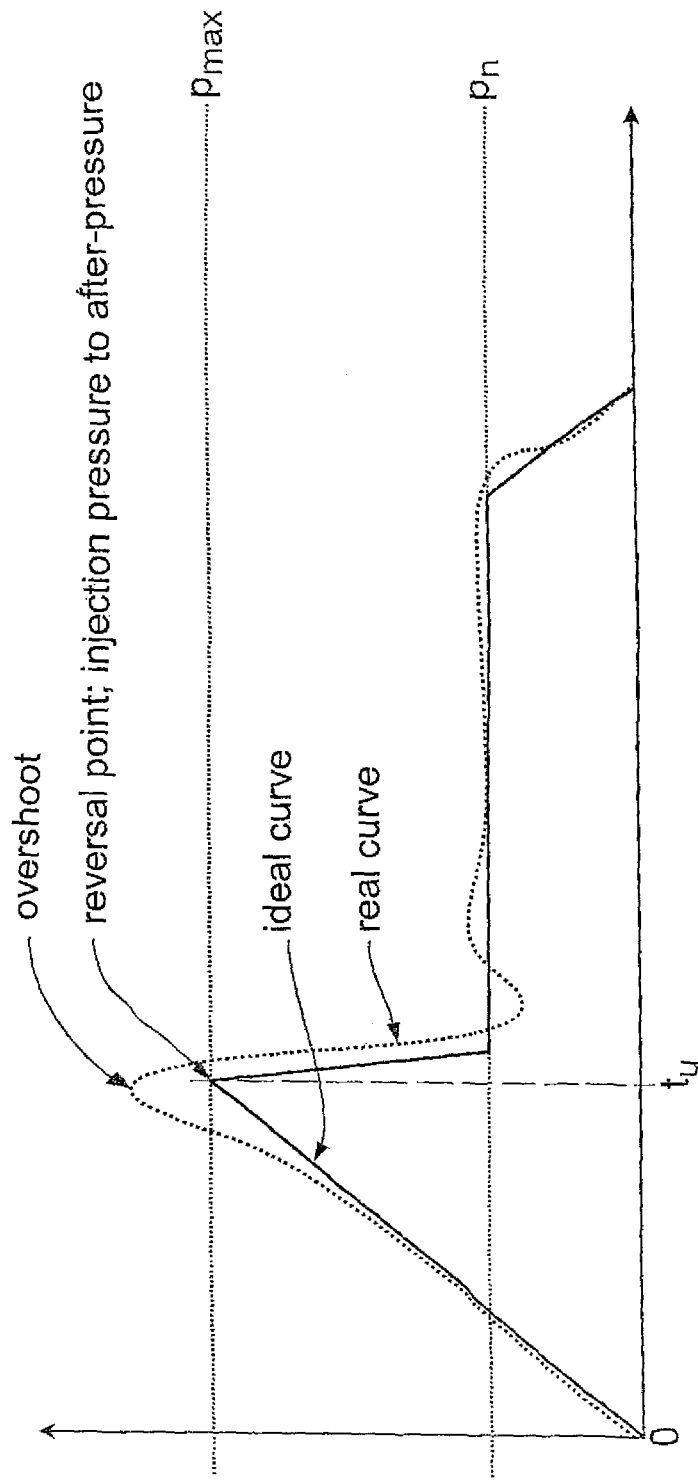
FIG. 7 shows a time/pressure graph to illustrate the injection-pressure and after-pressure behaviour of an injection moulding machine and FIG. 8 shows a perspective partially broken-away view of an ER valve block to activate two axles.

Finally, FIG. 7 clarifies the advantages of the implementation of the drive of an injection moulding machine with the aid of electrorheological hydraulic components using the example of the screws feed and withdrawal. Thus, the pressure generated by the screw in a time dependency during an injection process is recorded in this graph. Thus, during the injection process, from t=0 to the instant $t=t_u$, the injection pressure rises up to its maximum desired value $p_{max}$. In conventional, comparatively sluggish drives, there is the risk of overshoots (see dotted line in FIG. 7) so the maximally allowed injection pressure is exceeded with the negative effects outlined at the outset. In comparison, the continuous ideal curve can be achieved considerably better with the aid of the rapid ER valves. In this, the injection pressure can be controlled downward very rapidly to the after-pressure value $p_n$. In the dotted "real curve" undershoots can also be adjusted here, which are just as disadvantageous as overshoots.

What is claimed is:

1. An injection moulding machine, comprising:
   an injection unit with a plasticising screw and drive units for the movement of the injection unit and for the injection and after-pressure stroke of the plasticising screw,
   a fixed and a moveable tool clamping plate,
   a mould closing unit with a drive unit for generating the mould closing and opening movement of the moveable tool clamping plate and the tool closing force during injection, and
   a drive unit for a workpiece ejector device,
   wherein at least one of the drive units is a hydraulic drive unit with a hydraulic pump, a hydraulic cylinder configured as two-way cylinder and at least one control valve to activate the hydraulic cylinder,
   wherein
   the hydraulic fluid of the hydraulic drive unit is an electrorheological fluid, and
   the at least one control valve for the hydraulic cylinder is an electrorheological valve with
      at least one through-flow gap for the electrorheological fluid and
      a plate capacitor arrangement for applying an electric control field across the through-flow gap; and
      an H-valve full bridge consisting of four electrorheological valves, said H-valve full bridge activating the two way cylinder.

2. The injection moulding machine of claim 1, wherein a hydraulic fluid store for the electrorheological fluid under pressure is associated with the at least one hydraulic pump.

3. The injection moulding machine of claim 1, wherein a central hydraulic pump optionally with a hydraulic store is provided for a plurality of all the drive units of the injection and mould closing unit.

4. The injection moulding machine of claim 1, wherein a central hydraulic pump optionally with a hydraulic store is provided for all the drive units of the injection and mould closing unit.

5. The injection moulding machine of claim 1, wherein a separate hydraulic pump optionally with a hydraulic store is associated with at least one of each drive unit of the injection and mould closing unit and the ejector device, one of the group of individually and in subgroups.

6. The injection moulding machine of claim 1, wherein the electrorheolooical valves are integrated in the hydraulic cylinders.

7. The injection moulding machine of claim 1, wherein at least two electrorheological valves are combined in a valve block for a respective axle to be driven of the injection moulding machine.

8. An injection moulding machine, comprising:
- an injection unit with a plasticizing screw and drive units for the movement of the injection unit and for the injection and after-pressure stroke of the plasticizing screw,
- a fixed and movable tool clamping plate,
- a mould closing unit with a drive unit for generating the mold closing and opening movement of the movable tool clamping plate and the tool closing force during injection, and
- a drive unit for a workpiece ejector device,
- wherein at least one of the drive units is a hybrid drive unit with a hydraulic pump, a hydraulic cylinder and at least one control valve to a activate the hydraulic cylinder,
- wherein the hydraulic fluid of the hydraulic drive unit is an electrorheological fluid,
- the at least one control valve with
  - at least one through-flow gap for the electrorheological fluid and
  - a plate capacitor arrangement for applying an electrtic control field across the through flow gap, and wherein the electrorheological valves are configured as annular gap valves.

9. The injection moulding machine of claim 8, wherein the annular gap valves have a potential-carrying core bar and an earthed housing surrounding the latter with the annular gap spacing.

10. The injection moulding machine of claim 8, wherein a hydraulic fluid store for the electrorheological fluid under pressure is associated with the at least one hydraulic pump.

11. The injection moulding machine of claim 8, wherein a central hydraulic pump optionally with a hydraulic store is provided for a plurality of all the drive units of the injection and mould closing unit.

12. The injection moulding machine of claim 8, wherein a central hydraulic pump optionally with a hydraulic store is provided for all the drive units of the injection and mould closing unit.

13. The injection moulding machine of claim 8, wherein a separate hydraulic pump optionally with a hydraulic store is associated with at least one of each drive unit of the injection and mould closing unit and the ejector device, one of the group of individually and in subgroups.

14. An injection moulding machine comprising:
- an injection unit with a Plasticizing screw and drive units for movement of the injection unit and for injection and after-pressure stroke of the plasticising screw;
- a fixed and movable tool clamping plate;
- a mould closing unit with a drive unit for generating the mold closing and opening movement of the movable tool clamping plate and the tool closing force during injection; and
- a drive unit for a workpiece ejector device,
- wherein at least one of the drive units is a hybrid drive unit with a hydraulic pump, a hydraulic cylinder configured as two-way cylinder and at least one control valve to a activate the hydraulic cylinder,
- wherein the hydraulic fluid of the hydraulic drive unit is an electrorheological fluid, wherein the at least one control valve for the hydraulic cylinder is an electrorheological valve with
  - at least one through-flow gap for the electrorheological fluid and
  - a plate capacitor arrangement for applying an electric control field across the through flow gap, and
- wherein the electrorheological valves are configured as annular gap valves and are assembled as valve groups of a large number of individual valve units.

15. The injection moulding machine of claim 14, wherein the electrorheological valves are assembled as valve groups of a large number of individual valve units connected in parallel.

* * * * *